United States Patent
Inomata et al.

(10) Patent No.: US 9,500,747 B2
(45) Date of Patent: Nov. 22, 2016

(54) TRAVEL DISTANCE MEASUREMENT DEVICE

(71) Applicants: Kenji Inomata, Chiyoda-ku (JP);
Wataru Tsujita, Chiyoda-ku (JP);
Kazuhiro Tahara, Chiyoda-ku (JP);
Seiya Nagashima, Chiyoda-ku (JP)

(72) Inventors: Kenji Inomata, Chiyoda-ku (JP);
Wataru Tsujita, Chiyoda-ku (JP);
Kazuhiro Tahara, Chiyoda-ku (JP);
Seiya Nagashima, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 373 days.

(21) Appl. No.: 14/342,981

(22) PCT Filed: Dec. 3, 2012

(86) PCT No.: PCT/JP2012/081269
§ 371 (c)(1),
(2) Date: Mar. 5, 2014

(87) PCT Pub. No.: WO2013/105359
PCT Pub. Date: Jul. 18, 2013

(65) Prior Publication Data
US 2014/0225765 A1  Aug. 14, 2014

(30) Foreign Application Priority Data

Jan. 10, 2012 (JP) .................................. 2012-002142
Sep. 4, 2012 (JP) .................................. 2012-194145

(51) Int. Cl.
*G01S 13/36* (2006.01)
*G01S 13/93* (2006.01)
(Continued)

(52) U.S. Cl.
CPC ............... *G01S 13/36* (2013.01); *G01C 22/02* (2013.01); *G01S 13/91* (2013.01); *G01S 13/931* (2013.01); *G01C 21/16* (2013.01)

(58) Field of Classification Search
CPC ........ G01S 13/06; G01S 13/08; G01S 13/36; G01S 13/91; G01S 13/931; G01C 21/12; G01C 21/16; G01C 22/00
USPC ...... 342/47, 70–72, 118, 127, 165, 173, 174
See application file for complete search history.

(56) References Cited

U.S. PATENT DOCUMENTS 3,680,092 A * 7/1972 Scott .................... G01S 13/36
342/102
3,833,906 A * 9/1974 Augustine ............... G01S 13/60
342/115
(Continued)

FOREIGN PATENT DOCUMENTS

JP    11 142509    5/1999
JP    2001 1898    1/2001
(Continued)

OTHER PUBLICATIONS

U.S. Appl. No. 14/342,995, filed Mar. 5, 2014, Inomata, et al.
(Continued)

*Primary Examiner* — Peter Bythrow
(74) *Attorney, Agent, or Firm* — Oblon, McClelland, Maier & Neustadt, L.L.P.

(57) ABSTRACT

A travel distance measurement device includes a transmitting antenna that is disposed in a vehicle and emits a transmission signal, as a radio wave, toward a ground surface, a receiving antenna that is disposed in the vicinity of the transmitting antenna, and receives a radio wave reflected from the ground surface and acquires a reflection signal, and a distance calculator (an IQ demodulator and a phase conversion integrator) that calculates the travel distance of the vehicle on the basis of the phase of the acquired reflection signal.

6 Claims, 10 Drawing Sheets

(51) Int. Cl.
*G01C 22/02* (2006.01)
*G01S 13/91* (2006.01)
*G01C 21/16* (2006.01)

(56) References Cited

U.S. PATENT DOCUMENTS

| | | | | |
|---|---|---|---|---|
| 3,859,660 A * | 1/1975 | Augustine | G01S 13/60 | 342/114 |
| 4,012,736 A * | 3/1977 | Angwin | G01S 13/92 | 327/31 |
| 4,065,745 A * | 12/1977 | Robinson | G01S 15/60 | 342/109 |
| 4,148,027 A * | 4/1979 | Nowogrodzki | G01S 13/50 | 342/104 |
| 4,354,191 A * | 10/1982 | Matsumura | G01S 7/023 | 342/104 |
| 4,414,548 A * | 11/1983 | Carpenter | G01S 13/60 | 340/441 |
| 4,489,321 A * | 12/1984 | Hoffa | G01S 13/60 | 342/115 |
| 4,635,059 A * | 1/1987 | Ball | G01S 13/60 | 342/117 |
| 4,713,665 A * | 12/1987 | Phelan | G01S 15/60 | 342/104 |
| 4,728,954 A * | 3/1988 | Phelan | G01S 15/60 | 342/115 |
| 4,920,345 A * | 4/1990 | Lissel | G01C 22/02 | 342/117 |
| 4,980,633 A * | 12/1990 | Roskoni | G01S 13/60 | 342/115 |
| 5,016,017 A * | 5/1991 | Kodera | G01S 13/60 | 342/106 |
| 5,061,932 A * | 10/1991 | Tribe | B60G 17/019 | 342/70 |
| 5,621,413 A * | 4/1997 | Lempkowski | G01S 13/003 | 342/106 |
| 5,696,515 A * | 12/1997 | Zyren | B60G 17/0165 | 342/104 |
| 5,986,601 A * | 11/1999 | Sugimoto | G01S 7/415 | 342/109 |
| 6,081,224 A * | 6/2000 | Rosenbrock | A01C 7/102 | 342/103 |
| 6,230,107 B1 * | 5/2001 | Yamamoto | G01P 3/66 | 342/104 |
| 6,445,338 B1 * | 9/2002 | Ohkubo | B60T 7/16 | 342/104 |
| 6,795,014 B2 * | 9/2004 | Cheong | G01S 7/4026 | 342/118 |
| 6,836,238 B1 * | 12/2004 | Orr | G01S 7/022 | 342/174 |
| 7,522,097 B2 * | 4/2009 | Wakeman | G01S 7/4026 | 342/13 |
| 8,363,211 B2 * | 1/2013 | Groitzsch | G01C 3/08 | 356/5.01 |
| 8,957,807 B2 * | 2/2015 | Mills | G01S 13/931 | 342/165 |
| 2002/0097180 A1 * | 7/2002 | Geisheimer | G01S 13/56 | 342/127 |
| 2005/0116854 A1 * | 6/2005 | Beez | G01S 7/4026 | 342/70 |
| 2007/0194982 A1 * | 8/2007 | Stove | G01S 7/4017 | 342/174 |
| 2010/0245156 A1 * | 9/2010 | Matsumoto | G01S 7/35 | 342/127 |
| 2011/0050525 A1 * | 3/2011 | Sanada | H01Q 1/3233 | 343/760 |

FOREIGN PATENT DOCUMENTS

| | | |
|---|---|---|
| JP | 2003 52105 | 2/2003 |
| JP | 2006 7818 | 1/2006 |
| JP | 2008 256704 | 10/2008 |
| JP | 2009 98097 | 5/2009 |
| JP | 2011 16432 | 1/2011 |

OTHER PUBLICATIONS

International Search Report Issued Dec. 25, 2012 in PCT/JP12/081269 Filed Dec. 3, 2012.

* cited by examiner

(b) Vehicle Mounting Angle=0 Degrees (c) Vehicle Mounting Angle≠0 Degrees

TRAVEL DISTANCE MEASUREMENT DEVICE

FIELD OF THE INVENTION

The present invention relates to a travel distance measurement device that measures the travel distance of a vehicle.

BACKGROUND OF THE INVENTION

As a travel distance measurement device that is mounted to a vehicle (railroad train) and measures the travel distance of the vehicle by using a radio wave, there is provided, for example, a device that uses a Doppler frequency, as shown in patent reference 1. The device shown in this patent reference 1 emits a radio wave as a transmission signal toward a ground surface (rail track surface) first, and acquires a Doppler signal component by mixing a reflection signal which is a reflected wave reflected from the ground surface with the transmission signal. The device then analyzes the Doppler frequency of the signal and calculates and integrates the traveling speed of the vehicle, thereby acquiring the travel distance of the vehicle.

RELATED ART DOCUMENT

Patent Reference

Patent reference 1: Japanese Unexamined Patent Application Publication No. Hei 11-142509

SUMMARY OF THE INVENTION

Problems to be Solved by the Invention

However, in a conventional device, as shown in patent reference 1, that measures the travel distance of a vehicle by using a Doppler frequency, when a metallic object, such as a point or an iron bridge, exists in front of the device, the amplitude of a reflection signal rises rapidly (in a spike shape). A problem is that when a frequency analysis is performed on such a signal, noise occurs over a wide band, the traveling speed of the vehicle cannot be measured correctly, and an error occurs in the travel distance.

The present invention is made in order to solve the above-mentioned problem, and it is therefore an object of the present invention to provide a travel distance measurement device that can measure the travel distance of a vehicle correctly even when a metallic object exists in front of the device.

Means for Solving the Problem

In accordance with the present invention, there is provided a travel distance measurement device including: a transmitter that is disposed in a vehicle and emits a transmission signal, as a radio wave, toward a ground surface; a receiver that is disposed in the vicinity of the transmitter, and receives a radio wave emitted from the transmitter and reflected from the ground surface and acquires a reflection signal; and a distance calculator that calculates the travel distance of the vehicle on the basis of a result of integrating a variation of the phase difference between the reflection signal acquired by the receiver and the transmission signal.

Advantages of the Invention

Because the travel distance measurement device in accordance with the present invention is constructed as above, the travel distance measurement device can measure the travel distance of the vehicle correctly even when a metallic object exists in front of the device.

EMBODIMENTS OF THE INVENTION

Hereafter, the preferred embodiments of the present invention will be explained in detail with reference to the drawings. Although a case in which a travel distance measurement device in accordance with the present invention is mounted to a railroad train is shown hereafter, the travel distance measurement device can be similarly applied to other vehicles (e.g., cars).

Embodiment 1

Figure 1:
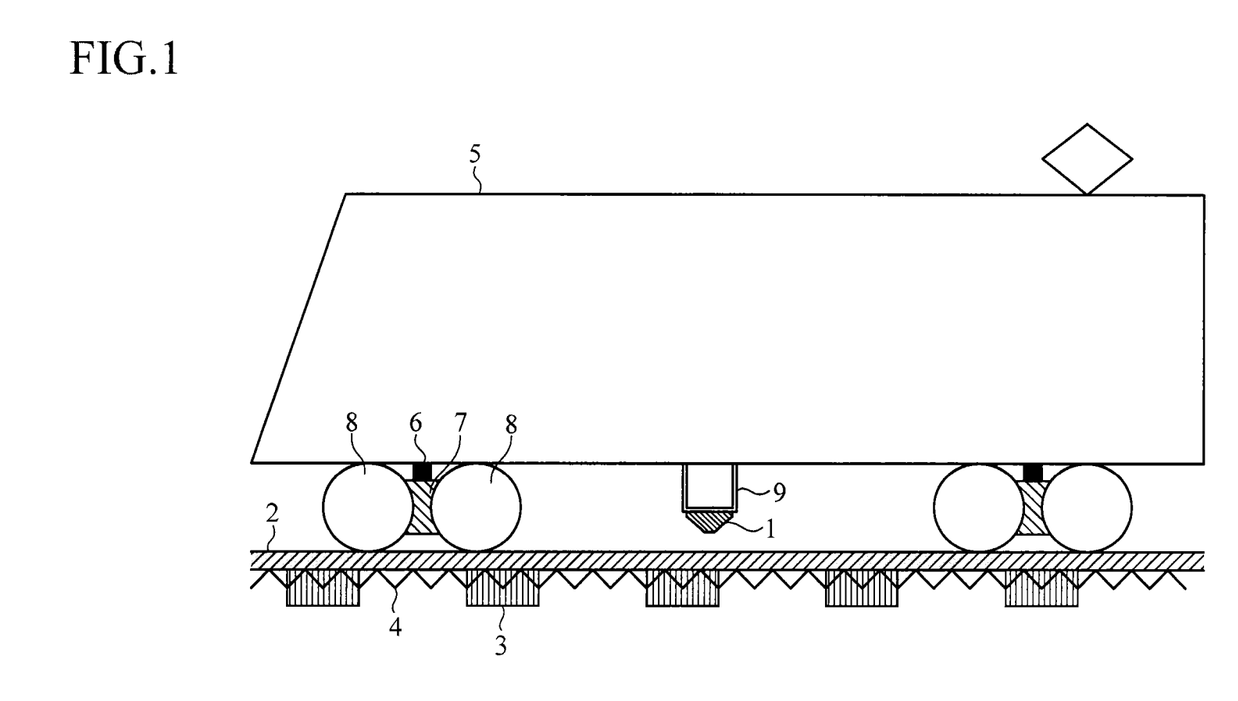
FIG. 1 is a diagram showing a vehicle to which a travel distance measurement device in accordance with Embodiment 1 of the present invention is mounted.

FIG. 1 is a diagram showing a railroad train to which the travel distance measurement device 1 in accordance with Embodiment 1 is mounted. As shown in FIG. 1, rails 2 are laid along a track along which a vehicle travels and sleepers 3 for supporting the rails 2 are laid under the rails at predetermined intervals. Further, gravels (ballast) 4 are packed between the sleepers 3. On the other hand, a railway bogie 7 is connected, via a connection shaft 6, to each of front and rear portions of the base of each vehicle body 5 of the railroad train, and wheels 8 are mounted to this railway bogie 7. Further, the travel distance measurement device 1 is mounted, via an outfitting member 9, to an approximately central portion of the base of the vehicle body 5 (midpoint between connection shafts 6). The gap between the base of the travel distance measurement device 1 and the upper surface of each of the rails 2 is set to be about 20 to 60 cm.

Figure 2:
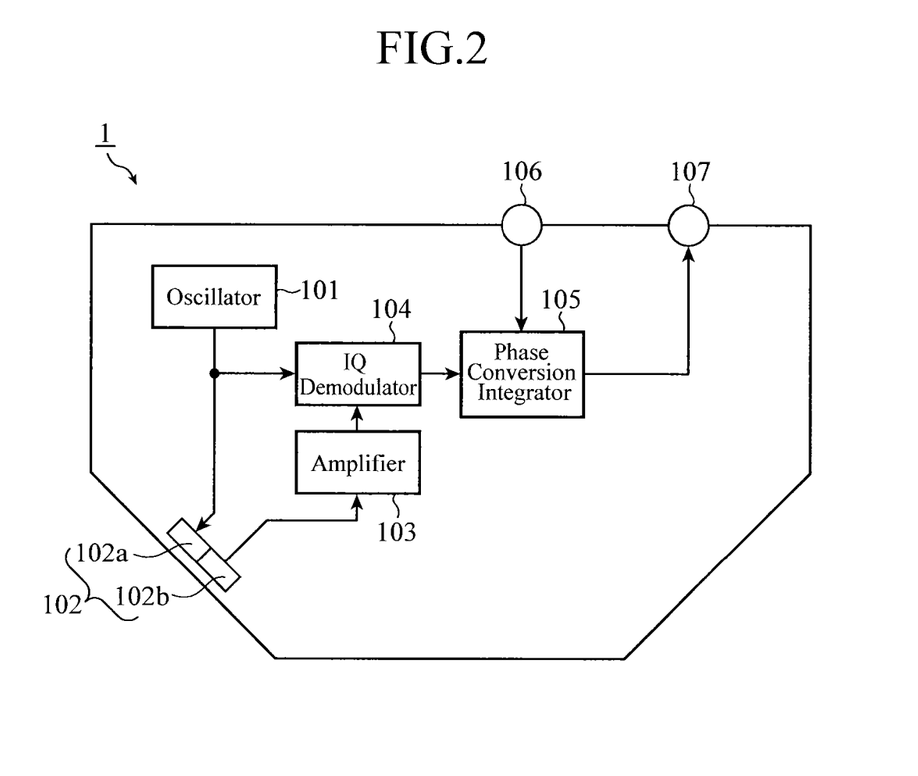
FIG. 2 is a diagram showing the internal structure of the travel distance measurement device in accordance with Embodiment 1 of the present invention.

Next, the internal structure of the travel distance measurement device 1 will be explained with reference to FIG. 2. The travel distance measurement device 1 measures the travel distance of the vehicle. This travel distance measurement 1 is comprised of an oscillator 101, a transmitting antenna (transmitter) 102a, a receiving antenna (receiver) 102b, an amplifier 103, an IQ demodulator 104, a phase conversion integrator 105, an input terminal 106, and an output terminal 107, as shown in FIG. 2.

The oscillator 101 generates a high frequency signal. In this embodiment, the oscillator 101 outputs a stable high frequency signal by synchronizing a PLL (phase lock loop) with a reference signal source having an excellent temperature characteristic, such as a crystal oscillator. The high frequency signal generated by this oscillator 101 is outputted as a transmission signal to the transmitting antenna 102a and the IQ demodulator 104.

The transmitting antenna 102a emits the transmission signal from the oscillator 101, as a radio wave, toward a ground surface (in a direction which is oriented diagonally downward with respect to the traveling direction of the vehicle). The receiving antenna 102b is disposed in the vicinity of the transmitting antenna 102a, and receives a radio wave emitted from the transmitting antenna 102a and reflected from the ground surface and acquires a reflection signal. The reflection signal acquired by this receiving antenna 102b is outputted to the amplifier 103.

The transmitting antenna 102a and the receiving antenna 102b can be formed on an identical board in a case in which each of them is constructed of a patch antenna. In this case, they can be handled as one antenna 102 in view of components, and can be formed to include the transmitting antenna 102a and the receiving antenna 102b as its functions. It is further assumed that the polarization directions of the transmitting antenna 102a and the receiving antenna 102b are horizontal ones. More specifically, the polarization directions of the transmitting antenna and the receiving antenna are parallel to the longitudinal direction of the sleepers 3, while the polarization directions are perpendicular to the longitudinal direction of the rails 2.

The amplifier 103 amplifies the reflection signal from the receiving antenna 102b to a predetermined amplitude level. The reflection signal amplified by this amplifier 103 is outputted to the IQ demodulator 104.

The IQ demodulator 104 carries out orthogonal detection on the reflection signal from the amplifier 103 by using the transmission signal from the oscillator 101 as a reference signal. The signal on which the orthogonal detection is carried out by this IQ demodulator 104 is outputted to the phase conversion integrator 105.

The phase conversion integrator 105 calculates the travel distance of the vehicle by calculating and integrating the phase on the basis of the signal from the IQ demodulator 104. The phase conversion integrator 105 returns the travel distance to zero when the reset signal is inputted thereto from outside the travel distance measurement device via the input terminal 106. A signal showing the travel distance calculated by this phase conversion integrator 105 is outputted to the output terminal 107. The IQ demodulator 104 and the phase conversion integrator 105 construct a distance calculator.

Figure 3:
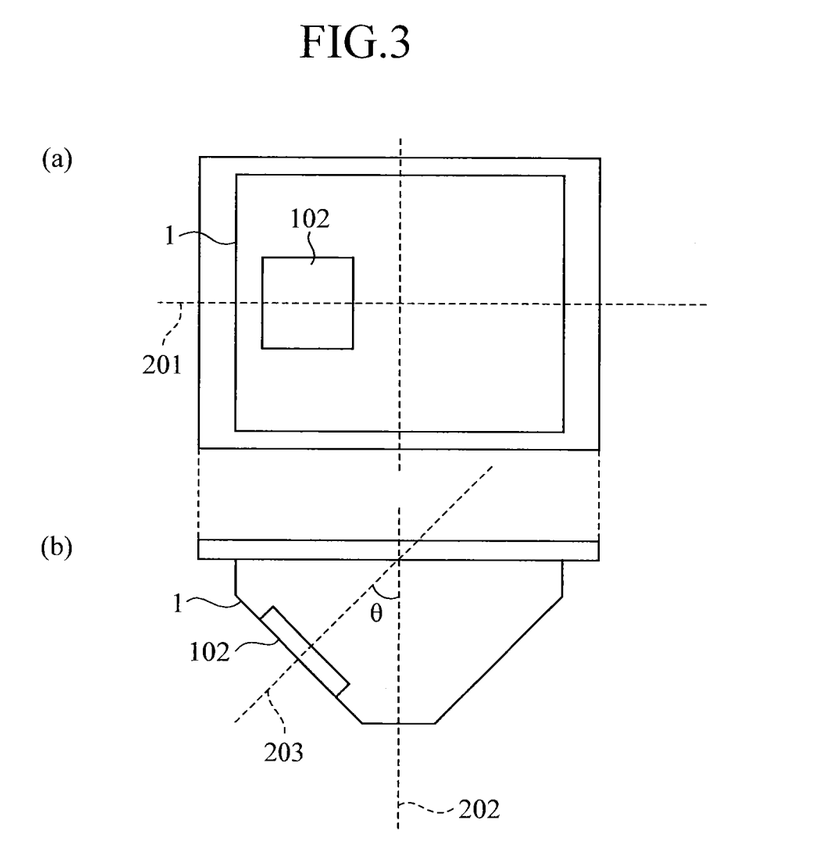
FIG. 3 is a diagram showing an example of the arrangement of antennas of the travel distance measurement device in accordance with Embodiment 1 of the present invention.

Next, an example of the arrangement of the antenna 102 of the travel distance measurement device 1 will be explained with reference to FIG. 3. FIG. 3(*a*) is a schematic diagram showing the travel distance measurement device 1 which is viewed from the base thereof, and FIG. 3(*b*) is a schematic diagram of the travel distance measurement device 1 which is viewed from one side thereof. In FIG. 3(*a*), a dashed line 201 is a bisector dividing the travel distance measurement device 1 equally and symmetrically into two right and left portions, and matches the traveling direction of the vehicle. Further, in FIG. 3(*b*), a dashed line 202 is a perpendicular bisector dividing the travel distance measurement device 1 equally and symmetrically into front and rear portions. Further, a dashed line 203 is inclined an angle θ with respect to the perpendicular line 202 toward the direction which is oriented diagonally downward with respect to the traveling direction of the vehicle. The angle θ is 45 degrees. As shown in this FIG. 3, the antenna 102 is placed in such a way that its center is located on the dashed line 201, and the direction of emitting the radio wave matches the dashed line 203.

Figure 4:
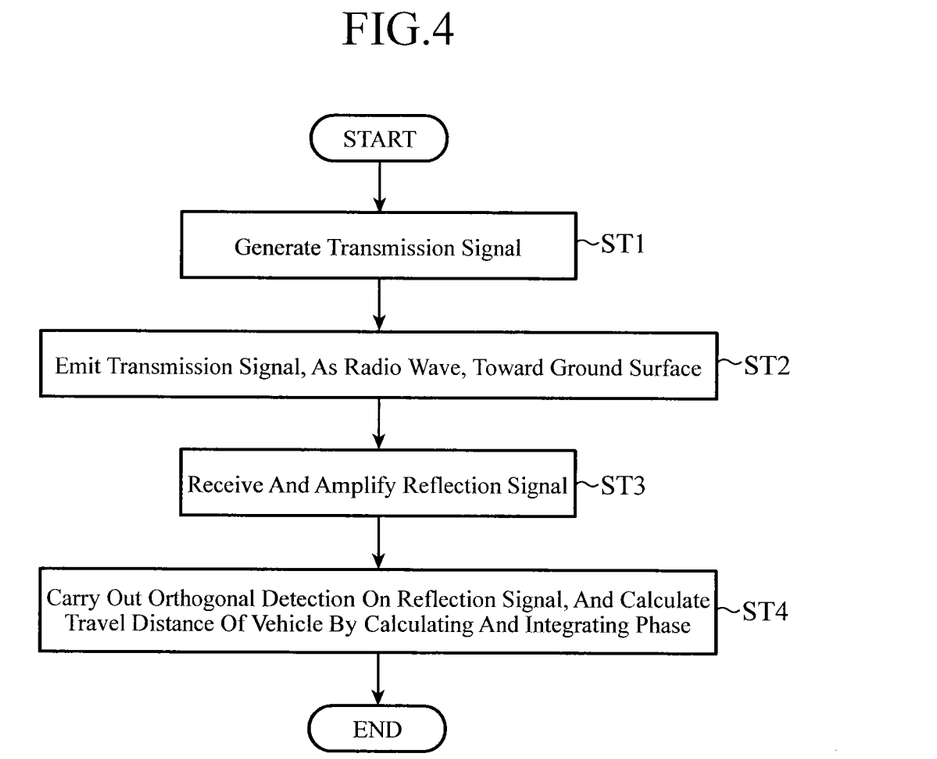
FIG. 4 is a flow chart showing the operation of the travel distance measurement device in accordance with Embodiment 1 of the present invention.

Next, the operation of the travel distance measurement device 1 constructed as above will be explained with reference to FIG. 4. In the operation of the travel distance measurement device 1, the oscillator 101 generates a high frequency signal (transmission signal) first, as shown in FIG. 4 (step ST1). In this embodiment, in order to make the phase of the reflected wave vary as the vehicle body 5 travels, it is necessary to choose a frequency which makes it possible to assume that the rail track surface is not smooth, but rough with respect to the transmission wave. A Rayleigh reference is known as a reference for this frequency, the rail track surface can be handled as a rough surface as long as the transmission wave has a wavelength shorter than one eighth of the gap between irregularities on an object. The gap between irregularities on a ground shape including sleepers 3 and gravels 4 is about 10 cm. In this case, by using a radio wave having a wavelength equal to or shorter than 10 cm÷8=1.25 cm, i.e., a radio wave having a frequency equal to or higher than 3×10^8÷0.0125 m=24 GHz, the rail track surface is assumed to be a rough surface with respect to the radio wave. The rail track surface is a horizontal plane including sleepers 3 and gravels 4. Needless to say, the rail track surface has an inclined portion which is called cant at its curved portion. A surface parallel to the upper surfaces of sleepers 3 is called a rail track surface.

Figure 5:
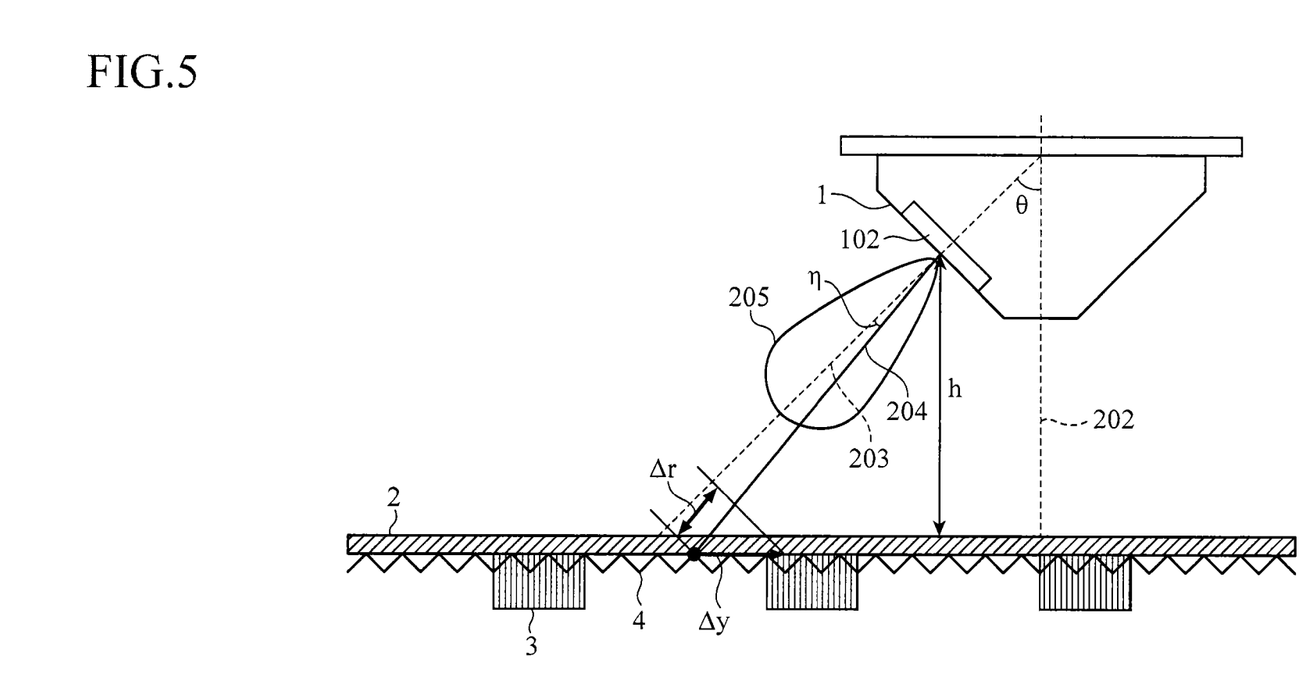
FIG. 5 is a diagram explaining transmission and reception of a radio wave which are carried out by the travel distance measurement device in accordance with Embodiment 1 of the present invention.

The transmitting antenna 102a then emits the transmission signal from the oscillator 101, as a radio wave, toward the ground surface (in a direction which is oriented diagonally downward with respect to the travelling direction of the vehicle) (step ST2). The transmission wave emitted from this transmitting antenna 102a is applied to a region centered at a point where the dashed line 203 intersects the rail track surface, as shown in FIG. 5, and is reflected by the sleepers 3 and the gravels 4 in the region to which the transmission wave is applied. Because the transmission wave is applied toward the diagonal direction, the reflection from a point slightly closer to the transmitting antenna than the point where the dashed line 203 intersects the rail track surface (point where a solid line 204 intersects the rail track surface) is the strongest. This is because the point closer to the transmitting antenna has a shorter distance between the antenna 102 and the rail track surface than the point where the dashed line intersects the rail track surface, and this variation depends upon the sharpness of the directivity of the transmitting antenna 102a. More specifically, the direction in which the reflection intensity is the strongest moves closer to the dashed line 203 (the variation decreases) as the directivity becomes sharper, while the direction in which the reflection intensity is the strongest moves further from the dashed line 203 (the variation increases) as the directivity becomes wider. For example, in a case in which the transmitting antenna 102a and the receiving antenna 102b are arranged close to each other (at a distance of about 10 cm or shorter from each other), the direction in which the transmitting antenna has a maximum directional gain is the same as that in which the receiving antenna has a maximum directional gain, the transmitting antenna and the receiving antenna are an antenna having 6×6 patches whose angle θ is 45 degrees, the reflection in a direction of 42 degrees is the strongest.

Then, the receiving antenna 102b receives a radio wave emitted from the transmitting antenna 102a and reflected by a ground surface and acquires a reflection signal, and the amplifier 103 amplifies this reflection signal to a predetermined amplitude level (step ST3).

Then, the IQ demodulator 104 carries out orthogonal detection on the reflection signal from the amplifier 103 by using the transmission signal from the oscillator 101 as the reference signal, and the phase conversion integrator 105 calculates the phase from the result of this orthogonal detection and integrates the phase to calculate the travel distance of the vehicle (step ST4). Hereafter, a change in the output of the phase conversion integrator 105 which is caused by the travel of the vehicle will be explained by using FIG. 5.

First, a method of determining the direction of the solid line 204 shown in FIG. 5 will be explained. In the example shown in FIG. 5, it is assumed that the transmitting antenna 102a has the same directivity pattern 205 as the receiving antenna 102b. Further, a function showing the directivity pattern 205 is expressed by F(η). η is the angle which the solid line has with respect to the dashed line 203. If the ground reflectivity and the absolute gain of the antenna 102 can be neglected, the intensity H(η) of the reflected wave is expressed by the following equation (1).

$$H(\eta) = \left(\frac{F(\eta)}{4\pi}\left(\frac{\cos(\theta - \eta)}{h}\right)^2\right)^2 \quad (1)$$

where h is the height from the rail track surface to the midpoint between the transmitting antenna 102a and the receiving antenna 102b. When the angle η maximizing this H(η) is determined, the direction of the angle is defined as the direction of the solid line 204. The directivity patterns 205 of the transmitting antenna 102a and the receiving antenna 102b are measured in advance. Using this equation (1), the direction of the solid line 204 (angle η) can be determined from the directivity pattern 205 (F(η)) of the antenna 102, the height h of the antenna 102, and the mounting angle θ of the antenna 102. After that, the travel distance of the vehicle is calculated by using the reflected wave propagating from the direction of this solid line 204.

In the example shown in FIG. 5, gravels 4 (or sleepers 3 or the like) exist at the point where the solid line 204 and the rail track surface intersect each other, and a vector Δy shows the direction in which these gravels 4 apparently travel per micro unit time and the distance which the gravels apparently travel per micro unit time. Needless to say, although the gravels 4 do not travel actually while the vehicle (travel distance measurement device 1) travels actually, a travel will be considered hereafter with reference to the travel distance measurement device 1. Further, each micro unit time is a time interval during which the distance traveled by the vehicle travelling at its maximum speed is a value (1/10 or less) sufficiently smaller than the wavelength of the transmission wave.

An amount of change Δr of the distance which the gravels 4 travel with respect to the antenna 102 is expressed by the following equation (2).

$$\Delta r = \Delta y \times \sin(\theta - \eta) \quad (2)$$

Further, when the wavelength of the transmission wave is expressed by λ, the phase θ of the reflected wave changes per micro unit time by a value given by the following equation (3).

$$\Delta\theta = 2(2\pi/\lambda) \times \Delta r \quad (3)$$

This change of the phase Δθ appears as a change of the output of the IQ demodulator 104. At this time, the IQ demodulator 104 outputs an IQ signal having two components which are an I component and a Q component by carrying out orthogonal detection on the reflection signal and the transmission signal. Then, the phase conversion integrator 105 can acquire the phase from a tan(Q/I). a tan is an arc tangent. Because the difference phase between the phase and that acquired before one micro unit time is Δθ, the travel distance Δy per micro unit time can be calculated. Therefore, by integrating this difference phase Δθ, the distance which the vehicle has travelled during the integral time can be determined.

In the above explanation, the case in which the phase is determined from the output of the IQ demodulator 104, the difference phase is determined from this phase, and the travel distance is calculated by further integrating the difference phase is shown. However, the plurality of above-mentioned processes are unnecessary in actuality, and the travel distance of the vehicle can be calculated directly from the output of the IQ demodulator 104.

Figure 6:
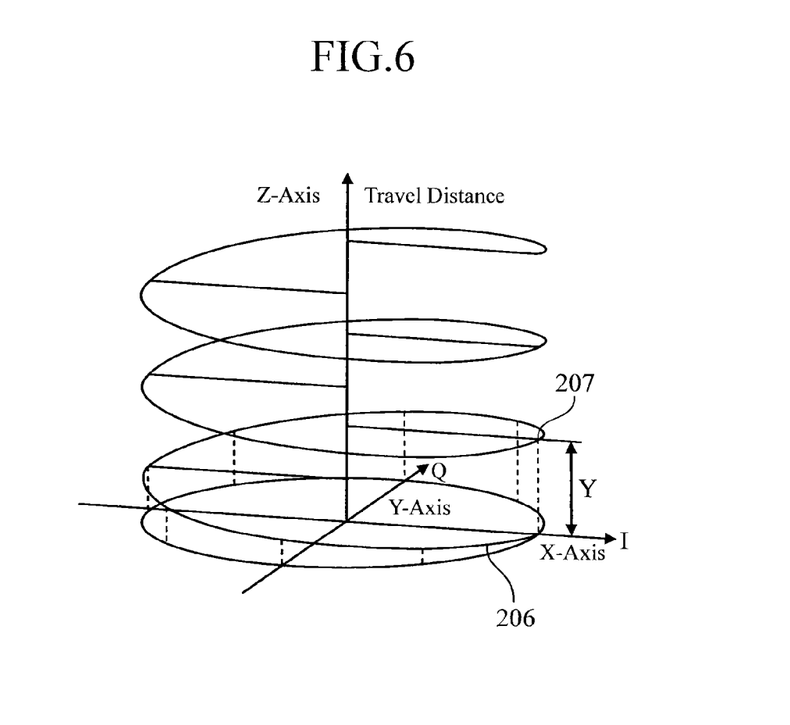
FIG. 6 is a diagram explaining the calculation of a travel distance which is carried out by a phase conversion integrator in accordance with Embodiment 1 of the present invention.

FIG. 6 is a diagram showing a relationship between the I component (X-axis) and the Q component (Y-axis) of the output of the IQ demodulator 104, and the travel distance (Z-axis) of the vehicle. Reference numeral 206 in this diagram denotes a spiral showing the phase rotating on an X-Y plane in such a way that the phase extends along a Z-axis. The phase rotates clockwise, and the clockwise rotation of the phase is defined as a positive rotation. When the integrated phase is determined from the output of the IQ demodulator 104, this integrated phase is defined as one point on the spiral 206. When the integrated phase is expressed by ψ, the travel distance Y is expressed by the following equation (4).

$$Y = \psi/(\sin(\theta - \eta) \times 4\pi/\lambda) \quad (4)$$

In FIG. 6, a point 207 on the spiral 206 is the one where the phase changes from 2π to 0. In this case, the phase is calculated by assuming that the phase rotates along the spiral 206, and, during the next rotation, does not return from 2π to 0, but rotates from 2π to 4π. Integrating the phase in such a way as to make these discontinuities of the phase continuous is known as phase unwrapping, and the method is used in this embodiment. More specifically, the phase is integrated over an interval of 2π or more, and the travel distance is determined from the integrated phase. The processing speed is important in order for this phase unwrapping to function well. More specifically, even when the vehicle is travelling at its maximum speed, the processing speed is determined in such a way that a number of sample points adequate for the phase to rotate one round are acquired. Therefore, it is necessary to carry out the processing at time intervals having a length equal to or smaller than one micro unit time explained previously.

As mentioned above, the phase conversion integrator 105 can calculate the travel distance directly from the output of the IQ demodulator 104 by integrating the rotation of the phase over an interval of $2\pi$ or more to determine the integrated phase. The travel distance measurement device 1 in accordance with the present invention does not use amplitude information when calculating the travel distance of the vehicle. This amplitude information is very unstable, and the amplitude changes greatly because the reflection conditions of the radio wave from the rail track vary due to rain, snowfall, etc. Further, the amplitude changes in spike shape when the vehicle travels above a metallic object, such as an iron bridge or point. The frequency component of this waveform having a spike shape has a very wide band, and a problem with a conventional method of calculating the travel distance of the vehicle by analyzing the Doppler frequency is that the Doppler spectrum changes greatly as a whole and the Doppler frequency cannot be acquired correctly. In contrast with this, because the travel distance measurement device 1 in accordance with the present invention can calculate the travel distance of the vehicle without using the amplitude information, the travel distance can be calculated correctly even when the reflection conditions of the radio wave from the rail track vary. The phase conversion integrator 105 returns the travel distance to zero when the reset signal is inputted thereto from outside the travel distance measurement device via the input terminal 106.

As mentioned above, because the travel distance measurement device in accordance with this Embodiment 1 is constructed in such a way as to measure the travel distance of the vehicle by using the phase of a reflected wave without using amplitude information, the travel distance measurement device can measure the travel distance of the vehicle correctly even in a state in which the conditions of reflection of the radio wave from the rail track vary, such as when a metallic object exists in front of the travel distance measurement device. Further, because the travel distance measurement device is constructed in such a way as to use a reflected wave from a direction in which the reflection intensity is maximized, the measurement accuracy can be improved.

Embodiment 2

In Embodiment 1, as shown in FIG. 3, the case in which the direction of measurement of the travel distance measurement device 1 (direction of emitting the radio wave at a time when the travel distance measurement device 1 is projected onto a bottom view or top plan view thereof) is the direction of the dashed line 201, and this direction of the dashed line 201 matches the vehicle traveling direction is explained. In contrast with this, in Embodiment 2, a case in which the direction of measurement (direction of the dashed line 201) does not match the vehicle traveling direction will be explained.

Figure 7:
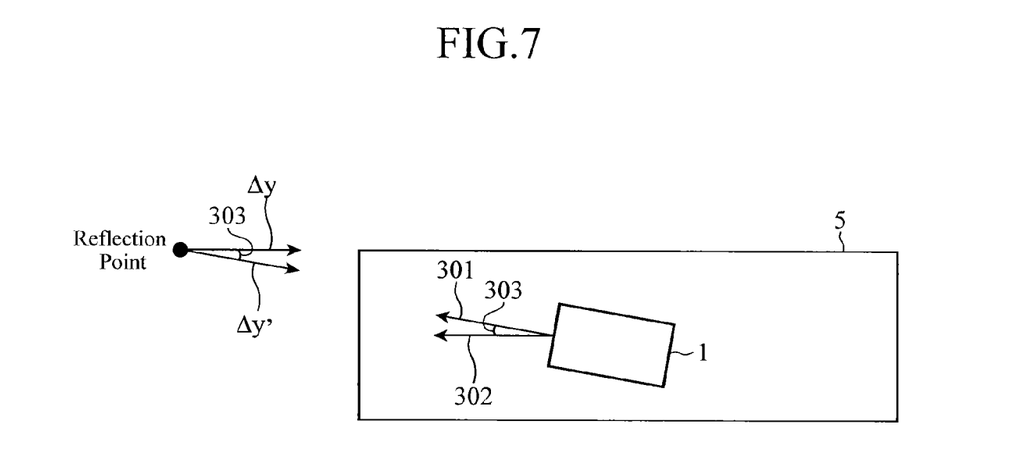
FIG. 7 is a diagram explaining a vehicle mounting angle of a travel distance measurement device in accordance with Embodiment 2 of the present invention.

FIG. 7 is a diagram explaining a vehicle mounting angle 303 of a travel distance measurement device 1 in accordance with Embodiment 2 of the present invention. In this embodiment, the angle which the direction of measurement 301 (direction of the dashed line 201 shown in FIG. 3) forms with the vehicle traveling direction 302 is referred to as the vehicle mounting angle (yaw angle) 303 of the travel distance measurement device 1. In Embodiment 1, the case in which the direction of measurement 301 matches the vehicle traveling direction 302, i.e., the vehicle mounting angle 303 is 0 degrees is explained. In contrast with this, in Embodiment 2, a case in which the vehicle mounting angle 303 is $\Delta\alpha$ ($\neq 0$) will be explained.

First, a problem arising when the angle (vehicle mounting angle 303) which the direction of measurement 301 of the travel distance measurement device 1 forms with the vehicle traveling direction 302 is $\Delta\alpha$ ($\neq 0$) will be explained. A vector $\Delta y$ shown in FIG. 7 is the same as the vector $\Delta y$ shown in FIG. 5. More specifically, taking as a reference the vehicle (travel distance measurement device 1), the vector $\Delta y$ shows the direction in which reflection points which make a radio wave reflect most strongly, such as gravels 4 (or sleepers 3), apparently travel per micro unit time as the vehicle travels in its traveling direction, and the distance which the reflection points apparently travel per micro unit time, as explained in Embodiment 1. In contrast, a vector $\Delta y'$ shown in FIG. 7 is defined with reference to the direction of measurement 301 of the travel distance measurement device 1, and shows the direction in which reflection points which make a radio wave reflect most strongly, such as gravels 4 (or sleepers 3), apparently travel per micro unit time as the vehicle travels in its traveling direction, and the distance which the reflection points apparently travel per micro unit time when the vehicle mounting angle 303 is $\Delta\alpha$ ($\neq 0$).

At this time, the following relational expression (5) is established between the vector $\Delta y$ and the vector $\Delta y'$.

$$\Delta y = \Delta y'/\cos(\Delta\alpha) \tag{5}$$

More specifically, when the vehicle mounting angle 303 is 0 degrees, the travel distance of the vehicle matches the travel distance calculated by the travel distance measurement device 1. However, when the vehicle mounting angle 303 is $\Delta\alpha$, the travel distance calculated by the travel distance measurement device 1 is shorter than the travel distance of the vehicle by $\cos(\Delta\alpha)$. For example, when $\Delta\alpha$ is 2.5 degrees, the travel distance calculated by the travel distance measurement device 1 is shorter than the actual travel distance by about 0.1%.

As mentioned above, when the vehicle mounting angle 303 is $\Delta\alpha$ ($\neq 0$), the travel distance calculated by the travel distance measurement device 1 is shorter than the travel distance of the vehicle on which the operation is performed, and a measurement error occurs. Therefore, in order to carry out the travel distance measurement with a super-high degree of accuracy, it is necessary to mount the travel distance measurement device 1 in such a way that the vehicle mounting angle 303 of the travel distance measurement device 1 is 0 degrees. However, a problem is that the mounting operation is difficult. A further problem is that it is necessary to perform a maintenance operation of determining whether the vehicle mounting angle 303 has changed due to secular changes at regular intervals, and this operation takes a deal of time.

In addition, in order to suppress travel measurement errors in a railroad field, there is provided a method of correcting measurement errors by using wayside coils and pickup coils. Each wayside coil is an ID tag which is installed between tracks and stores travel distance information at its installation point. Further, each pickup coil is a reader which is installed in a railroad train and reads travel distance information stored in a wayside coil. By then correcting the travel distance calculated by the travel distance measurement device 1 in turn on the basis of the travel distance information which is read from a wayside coil by a pickup coil when the railroad train is traveling between tracks, travel measurement errors can be suppressed. A problem with this method is, however, that a plurality of wayside coils need to be installed, and hence an installation cost and a maintenance cost are needed.

Embodiment 2 is made in order to solve the above-mentioned problem, and it is an object of this embodiment to provide a travel distance measurement device 1 that can measure the travel distance of a vehicle correctly even when the vehicle mounting angle 303 is not 0 degrees.

Figure 8:
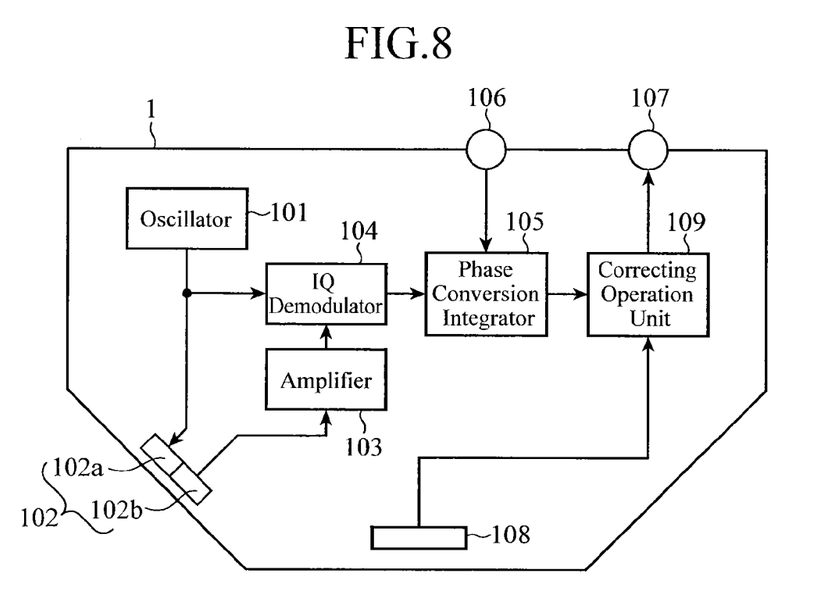
FIG. 8 is a diagram showing the internal structure of the travel distance measurement device in accordance with Embodiment 2 of the present invention.

FIG. 8 is a diagram showing the internal structure of the travel distance measurement device 1 in accordance with Embodiment 2 of the present invention. The travel distance measurement device 1 in accordance with Embodiment 2 shown in FIG. 8 includes a mounting angle detector (deflection error detector) 108 and a correcting operation unit (correcting operator) 109 in addition to the travel distance measurement device 1 in accordance with Embodiment 1 shown in FIG. 2. The other structural components are the same as those in accordance with Embodiment 1 and are designated by the same reference numerals, and therefore the explanation of the structural components will be omitted hereafter. A phase conversion integrator 105 outputs a signal showing the calculated travel distance to the correcting operation unit 109.

The mounting angle detector 108 calculates the angle (vehicle mounting angle 303) which the direction of measurement (direction of emitting the radio wave) of the travel distance measurement device 1 forms with the traveling direction of the vehicle. A signal showing the vehicle mounting angle 303 calculated by this mounting angle detector 108 is outputted to the correcting operation unit 109. The internal structure of this mounting angle detector 108 will be mentioned below.

The correcting operation unit 109 corrects the travel distance calculated by the phase conversion integrator 105 by using the vehicle mounting angle 303 calculated by the mounting angle detector 108 to calculate a corrected travel distance. A signal showing the corrected travel distance calculated by this correcting operation unit 109 is outputted to an output terminal 107.

Figure 9:
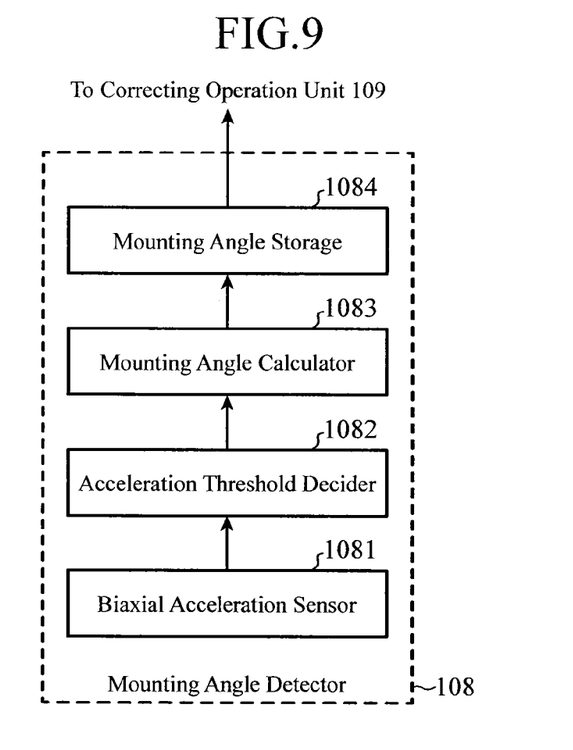
FIG. 9 is a diagram showing the structure of a mounting angle detector in accordance with Embodiment 2 of the present invention.

Next, the internal structure of the mounting angle detector 108 will be explained with reference to FIG. 9. The mounting angle detector 108 is comprised of a biaxial acceleration sensor 1081, an acceleration threshold decider 1082, a mounting angle calculator 1083, and a mounting angle storage 1084, as shown in FIG. 9.

The biaxial acceleration sensor 1081 measures an acceleration caused by acceleration and deceleration of the vehicle (power running and regeneration of the railroad train). A signal showing the acceleration measured by this biaxial acceleration sensor 1081 is outputted to the acceleration threshold decider 1082.

The acceleration threshold decider 1082 carries out threshold decision on the acceleration measured by the biaxial acceleration sensor 1081 after removing an acceleration component resulting from a vibration of the vehicle (railroad train) from the acceleration. When deciding that the acceleration satisfies a predetermined threshold, the acceleration threshold decider 1082 outputs a signal showing the acceleration to the mounting angle calculator 1083.

The mounting angle calculator 1083 calculates the vehicle mounting angle 303 by using the acceleration which is decided to satisfy the threshold by the acceleration threshold decider 1082. A signal showing the vehicle mounting angle 303 calculated by this mounting angle calculator 1083 is outputted to the mounting angle storage 1084.

The mounting angle storage 1084 stores the signal showing the vehicle mounting angle 303 calculated by the mounting angle calculator 1083. The signal stored in this mounting angle storage 1084 and showing the vehicle mounting angle 303 is outputted to the correcting operation unit 109.

Figure 10:
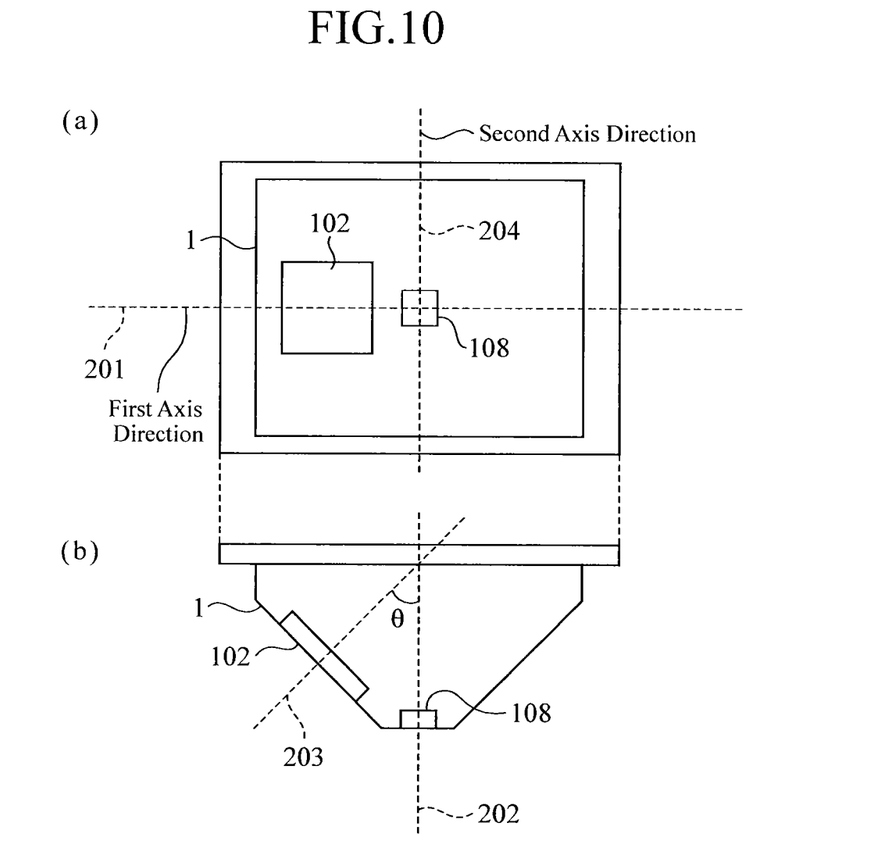
FIG. 10 is a diagram showing an example of the arrangement of antennas and the mounting angle detector of the travel distance measurement device in accordance with Embodiment 2 of the present invention.

Next, an example of the arrangement of the mounting angle detector 108 of the travel distance measurement device 1 will be explained with reference to FIG. 10. FIG. 10 additionally shows an example of the arrangement of the mounting angle detector 108 in addition to the components of the travel distance measurement device 1 shown in FIG. 3, FIG. 10(*a*) is a schematic diagram showing the travel distance measurement device 1 which is viewed from the base thereof, and FIG. 10(*b*) is a schematic diagram of the travel distance measurement device 1 which is viewed from one side thereof. Because an example of the arrangement of an antenna 102 is the same as that shown in FIG. 3, the explanation of the arrangement will be omitted hereafter. Further, a dashed line 204 intersects a dashed line 202 at right angles, and extends in a direction perpendicular to a dashed line 201 in a plane shown in FIG. 10(*a*).

The mounting angle detector 108 (biaxial acceleration sensor 1081) is placed in such a way as to measure an acceleration parallel to the dashed line 201 matching the vehicle traveling direction (acceleration value Ax in a direction of a first axis) and measure an acceleration parallel to the dashed line 204 extending in a direction perpendicular to the vehicle traveling direction (acceleration value Ay in a direction of a second axis).

Figure 11:
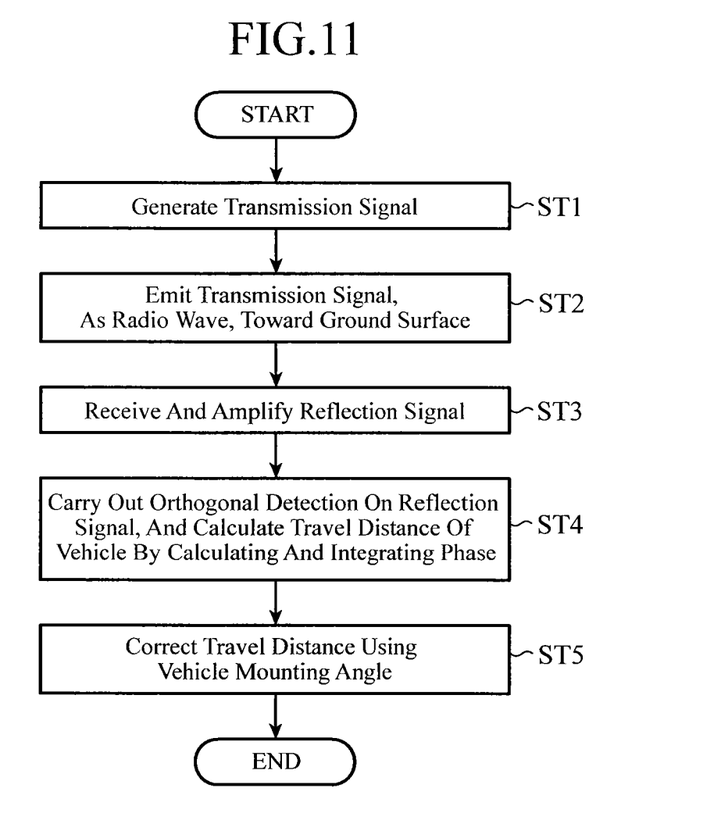
FIG. 11 is a flow chart showing the operation of the travel distance measurement device in accordance with Embodiment 2 of the present invention.

Next, the operation of the travel distance measurement device 1 constructed as above will be explained with reference to FIG. 11. Steps ST1 to ST4 of FIG. 11 are the same as those of FIG. 4 respectively, and the explanation of the steps will be omitted hereafter. A signal showing the travel distance calculated by the phase conversion integrator 105 is outputted to the correcting operation unit 109. Further, the mounting angle detector 108 calculates the angle (vehicle mounting angle 303) which the direction of measurement (direction of emitting the radio wave) of the travel distance measurement device 1 forms with the traveling direction of the vehicle in advance, and notifies the angle to the correcting operation unit 109.

The correcting operation unit 109 then, in step ST5, corrects the travel distance calculated by the phase conversion integrator 105 by using the vehicle mounting angle 303 calculated by the mounting angle detector 108 to calculate the corrected travel distance. A signal showing the corrected travel distance calculated by this correcting operation unit 109 is outputted to the output terminal 107. A method of correcting the travel distance by using the mounting angle detector 108 and the correcting operation unit 109 will be shown hereafter.

Figure 12:
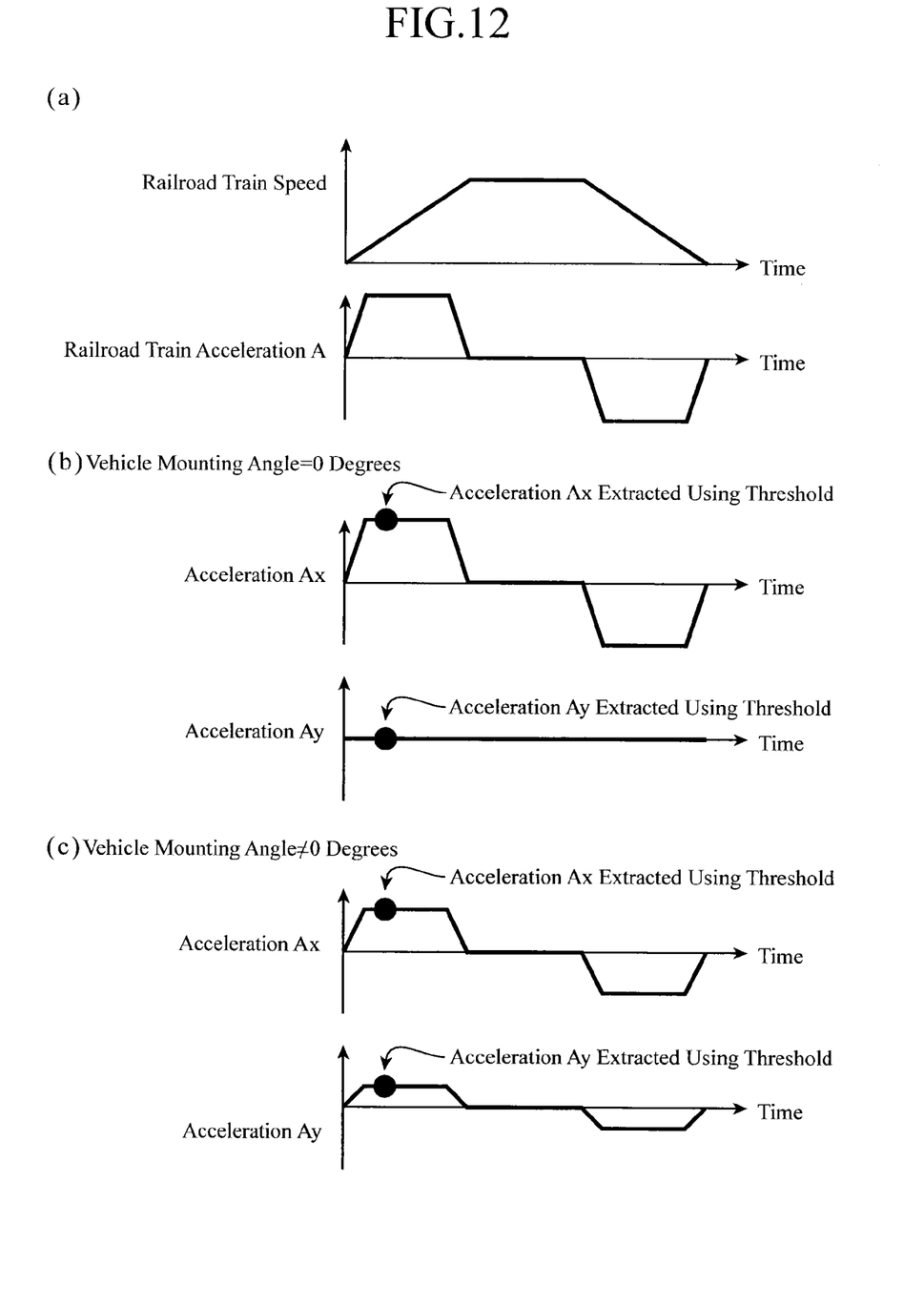
FIG. 12 is a diagram explaining the operation of the mounting angle detector in accordance with Embodiment 2 of the present invention.

FIG. 12 is a diagram explaining a relationship between a temporal change of the traveling speed of the vehicle (railroad train) and the measured value acquired by the biaxial acceleration sensor 1081. The result of removing the acceleration component resulting from a vibration of the vehicle is shown in FIG. 12. A method of removing the acceleration component resulting from a vibration of the vehicle will be mentioned below. As shown in this FIG. 12, when the vehicle accelerates or decelerates, the measured value acquired by the biaxial acceleration sensor 1081 varies.

As shown in FIG. 12(*b*), when the vehicle mounting angle 303 is 0 degrees, the acceleration value Ax in the direction of the first axis matches the acceleration of the vehicle and the acceleration value Ay in the direction of the second axis is zero in the measured value acquired by the biaxial acceleration sensor 1081. In contrast, when the vehicle mounting angle 303 is $\Delta\alpha$ ($\neq 0$), as shown in FIG. 12(*c*), the acceleration values Ax and Ay in the measured value acquired by the biaxial acceleration sensor 1081 are measured. When the acceleration of the vehicle is expressed by A, the measured values Ax and Ay acquired by the biaxial acceleration sensor are expressed by the following equations (6) and (7).

$$Ax = A\cos(\Delta\alpha) \quad (6)$$

$$Ay = A\sin(\Delta\alpha) \quad (7)$$

Therefore, the vehicle mounting angle $\Delta\alpha$ is calculated from the acceleration values Ax and Ay measured by the biaxial acceleration sensor 1081 according to the following equation (8).

$$\Delta\alpha = a\tan(Ay/Ax) \quad (8)$$

The correcting operation unit 109 then corrects the travel distance Y which is the output of the phase conversion integrator 105 on the basis of the vehicle mounting angle $\Delta\alpha$ calculated by the mounting angle detector 108 according to the following equation (9) to calculate the corrected travel distance YCAL, and outputs the corrected travel distance to the output terminal 107 as a final travel distance.

$$YCAL = Y/(\cos(\Delta\alpha)) \quad (9)$$

Next, a detailed operation of the mounting angle detector 108 will be explained. In the detailed operation of the mounting angle detector 108, the biaxial acceleration sensor 1081 measures an acceleration caused by acceleration and deceleration of the vehicle (power running and regeneration of the railroad train) first. A signal showing the acceleration measured by this biaxial acceleration sensor 1081 is outputted to the acceleration threshold decider 1082.

Then, when the signal showing the acceleration from the biaxial acceleration sensor 1081 is inputted, the acceleration threshold decider 1082 removes an acceleration component resulting from a vibration of the vehicle (railroad train) by using a filter or by performing a frequency analysis. When the vehicle is traveling with a uniform acceleration, the acceleration of the vehicle has a constant value and an acceleration resulting from a vibration of the vehicle is added to the value. Therefore, the removing process of separating the vehicle acceleration component and the vibration acceleration component from each other and removing the vibration acceleration component by using a low pass filter or by performing a frequency analysis can be carried out most efficiently. More specifically, for example, a moving average of the measured value over a one-second interval can be calculated as the low pass filter. As an alternative, there is a method of performing a frequency analysis on the measured acceleration to separate the acceleration at the time of acceleration and deceleration of the vehicle and the acceleration caused by a vibration of the vehicle from each other.

When the acceleration value in the direction of the first axis, which is included in the acceleration component caused by a vibration of the vehicle, is expressed by Nx, and the acceleration value in the direction of the second axis which is included in the acceleration component is expressed by Ny, the acceleration values measured by the biaxial acceleration sensor 1081 are expressed by the following equations (10) and (11) respectively.

$$Ax = A\cos(\Delta\alpha) + Nx \quad (10)$$

$$Ay = A\sin(\Delta\alpha) + Ny \quad (11)$$

In the above equations (6) and (7), the acceleration values Nx and Ny caused by a vibration of the vehicle are removed from the above equations (10) and (11) respectively.

The acceleration threshold decider 1082 then carries out threshold decision on the acceleration values Ax and Ay from which the acceleration components caused by a vibration of the vehicle (railroad train) are removed respectively. When determining that the acceleration satisfies the predetermined threshold, the acceleration threshold decider outputs a signal showing the acceleration to the mounting angle calculator 1083. As a threshold, there is an acceleration value, the absolute value of an acceleration, a temporal change width in the acceleration, or a combination of some of these values. More specifically, for example, in order to extract the acceleration when the vehicle is traveling with a uniform acceleration, what is necessary is just to extract the acceleration whose acceleration value Ax exceeds the predetermined threshold and whose temporal change width (standard deviation) of the acceleration Ax falls within a predetermined range.

The mounting angle calculator 1083 then calculates the vehicle mounting angle 303 by using the acceleration which is decided to satisfy the threshold by the acceleration threshold decider 1082 according to the above equation (8). A signal showing the vehicle mounting angle 303 calculated by this mounting angle calculator 1083 is outputted to the mounting angle storage 1084.

The mounting angle storage 1084 then stores the signal showing the vehicle mounting angle 303 calculated by the mounting angle calculator 1083. The signal showing the vehicle mounting angle 303 stored in this mounting angle storage 1084 is then outputted to the correcting operation unit 109.

The time that the vehicle mounting angle 303 is measured will be shown below. For example, in a case in which the vehicle is a railroad train, the vehicle mounting angle is measured when the railroad train is traveling on a track which is realized in advance to be a straight section after the travel distance measuring device 1 is mounted to the vehicle body 5 in a railroad yard.

As mentioned above, because the travel distance measurement device in accordance with this Embodiment 2 is constructed in such a way as to correct an error occurring when the vehicle mounting angle 303 is not 0 degrees (an erroneous result showing the travel distance measured by the travel distance measurement device 1 being shorter than the actual travel distance) by detecting the vehicle mounting angle 303, the travel distance measurement device can measure the travel distance of the vehicle correctly even though the vehicle mounting angle 303 is not 0 degrees, in addition to the advantages provided by Embodiment 1.

Further, because the travel distance measurement device can measure the travel distance of the vehicle correctly even though the vehicle mounting angle 303 is not 0 degrees, the necessity to perform an adjustment operation of adjusting the vehicle mounting angle 303 to 0 degrees can be eliminated, the operation of mounting the travel distance measurement device to the vehicle is facilitated, and the maintenance of the travel distance measurement device is improved.

In addition, because the travel distance measurement device can measure the travel distance of the vehicle correctly regardless of the vehicle mounting angle 303, the number of wayside coils disposed for travel distance correction in a railroad field can be reduced or wayside coils can be abolished completely, and the installation cost and the maintenance cost can be reduced.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The travel distance measurement device in accordance with the present invention can measure the travel distance of a vehicle correctly even when a metallic object exists in front of the device, and is suitable for use as a travel distance measurement device or the like that measures the travel distance of a vehicle.

EXPLANATIONS OF REFERENCE NUMERALS

1 travel distance measurement device, 2 rail, 3 sleeper, 4 gravel, 5 vehicle body, 6 connection shaft, 7 railway bogie, 8 wheel, 9 outfitting member, 101 oscillator, 102 antenna, 102a transmitting antenna (transmitter), 102b receiving antenna (receiver), 03 amplifier, 104 IQ demodulator, 105 phase conversion integrator, 106 input terminal, 107 output terminal, 108 mounting angle detector (deflection error detector), 109 correcting operation unit (correcting operator), 1081 biaxial acceleration sensor, 1082 acceleration threshold decider, 1083 mounting angle calculator, 1084 mounting angle storage.

The invention claimed is:

1. A travel distance measurement device comprising:
   a transmitter that is disposed in a vehicle and emits a transmission signal, as a radio wave, toward a ground surface;
   a receiver that is disposed in a vicinity of said transmitter, and receives a radio wave emitted from said transmitter and reflected from said ground surface and acquires a reflection signal; and
   a distance calculator that calculates a travel distance of said vehicle on a basis of a result of integrating a variation of a phase difference between the reflection signal acquired by said receiver and said transmission signal.

2. The travel distance measurement device according to claim 1, wherein said distance calculator calculates the travel distance of said vehicle by using an angle which is calculated on a basis of emission patterns, heights, and mounting angles of said transmitter and said receiver and at which the reflection signal reflected from the ground surface has a maximum intensity.

3. The travel distance measurement device according to claim 1, wherein said distance calculator calculates the phase by carrying out orthogonal detection on said reflection signal using said transmission signal, and calculates the travel distance from an integrated phase which said transmitter acquires by integrating a variation of said phase over an interval of $2\pi$ or more.

4. The travel distance measurement device according to claim 1, wherein said transmitter uses a radio wave having a frequency of 24 GHz or more.

5. The travel distance measurement device according to claim 1, wherein said travel distance measurement device includes: a direction error detector that calculates an angle which a direction of emitting said radio wave forms with a traveling direction of the vehicle; and a correcting operator that corrects the travel distance calculated by said distance calculator by using the angle calculated by said direction error detector.

6. The travel distance measurement device according to claim 5, wherein said direction error detector measures an acceleration caused by acceleration and deceleration of the vehicle, and calculates said angle on a basis of said measured acceleration.

* * * * *